United States Patent [19]

Mrozack, Jr. et al.

[11] Patent Number: 4,703,658
[45] Date of Patent: Nov. 3, 1987

[54] PRESSURE SENSOR ASSEMBLY

[75] Inventors: James Mrozack, Jr., Highland Park; Bernard Greenstein, Glenview, both of Ill.

[73] Assignee: Motorola, Inc., Schaumburg, Ill.

[21] Appl. No.: 876,067

[22] Filed: Jun. 18, 1986

[51] Int. Cl.$^4$ ............................ G01L 7/08; G01L 9/12
[52] U.S. Cl. ................................ 73/724; 73/DIG. 4; 361/283
[58] Field of Search .................. 73/724, 718, DIG. 4; 361/283

[56] References Cited

U.S. PATENT DOCUMENTS 4,380,041 4/1983 Ho ........................................ 73/724
4,617,606 10/1986 Shak et al. ............................ 73/718

FOREIGN PATENT DOCUMENTS 0088633 5/1984 Japan ..................................... 73/718

Primary Examiner—Donald O. Woodiel
Attorney, Agent, or Firm—Phillip H. Melamed

[57] ABSTRACT

A pressure sensor assembly includes a pressure transducer having a pressure displaceable diaphragm bonded to a base. Displacement of the diaphragm results in varying of electrical characterisitcs of the transducer in response to sensed pressure. Electrical output connections (wires) of the transducer extend from a central portion of a top surface of the base, which faces the diaphragm, to a central portion of a base bottom surface and peripheral portions of the diaphragm and base top surface are hermetically bonded together. The transducer is mounted on a carrier plate and integral extensions of the electrical output connections pass through holes in the carrier plate. A housing for the sensor assembly has an opening therein to provide access to the diaphragm by ambient atmosphere/fluid surrouding the housing. A first inner seal bonds at least the peripheral portions of the base bottom surface to the carrier plate, and a second outer seal is positioned between the carrier plate top surface and walls of the housing. The housing walls, carrier plate and first and second seals form an effective seal against ambient atmosphere/fluid which contacts the diaphragm and, therefore, seal and protect the electrical output connections of the transducer. The housing walls form an internal cavity which is isolated from the sensed ambient atmosphere/fluid. Within the internal cavity components are connected to the extensions of the electrical output connections which pass through the carrier plate holes.

30 Claims, 2 Drawing Figures

PRESSURE SENSOR ASSEMBLY

CROSS REFERENCE TO RELATED APPLICATIONS

The present invention is related to the invention described in copending U.S. patent application Ser. No. 696,933, filed Jan. 31, 1985, entitled, "Capacitive Pressure Transducer" by Peter J. Shak and Roland K. Ho and having the same assignee as the present invention.

BACKGROUND OF THE INVENTION

The present invention is related to sensor assemblies, and more specifically to an advantageous configuration for a pressure sensor assembly utilized to sense pressure of an ambient atmosphere and/or fluid which may be corrosive with respect to the electrical output connections utilized in the pressure sensing element. The "atmosphere" being sensed may comprise either a gas or fluid. The term "pressure transducer" is used herein to refer to the pressure sensing element itself, as opposed to the "pressure sensor" or "pressure sensor assembly" which includes the transducer and various separate discrete electrical components that process output signals provided by the transducer.

Pressure transducers comprising a silicon capacitive pressure transducer are known in which a silicon diaphragm is anodically bonded to a metallized relatively rigid glass substrate base and wherein either metallized vias or embedded pins in the base may be utilized to provide the electrical output connections of the transducer. U.S. Pat. No. 4,384,899 to Myers illustrates such a pressure transducer utilizing metallized vias, whereas copending U.S. patent application Ser. No. 696,933, filed Jan. 31, 1985 to Shak et al. illustrates a transducer element utilizing embedded pins for feedthrough electrical connections instead of metallized vias. These pressure transducers, as well as piezoresistive pressure transducers (PRT's) having wire bonds exposed to the sensing atmosphere/fluid, have been utilized in pressure sensor assemblies wherein portions of either the electrical output connections or the wire bonds, which form a part of the electrical output connections of the transducer, are directly exposed to the ambient atmosphere/fluid being sensed. The metallized via transducers and the PRT's having wire bonds are typically reflow soldered or otherwise bonded onto the top surface of a metallized carrier circuit board. Then a sealing ring is provided on the carrier about the transducer. Sometimes a silastic sealing material is provided over the transducer, but this may interfere with pressure sensing. Also, the structures discussed above do not sufficiently prevent the sensed atmosphere and/or fluid from contacting electrical output connections of the transducer.

Typically prior sensor assemblies which have transducers with discrete lead wires extending from a bottom surface, such as the above-noted Shak et al. application, either utilize a portion of the pressure transducer or an extension thereof as part of a sealing means to provide a relatively hermetic seal between the ambient pressure atmosphere/fluid being sensed and other components positioned within a pressure sensor assembly housing in which the transducer is mounted. U.S. Pat. Nos. 3,352,157 and 4,380,014 both illustrate pressure sensor assemblies in which a lateral effective extension of either the pressure sensing diaphragm or the base of the pressure transducer is utilized as a mounting shoulder for a sealing O-ring. In either occurrence, the size of the pressure transducer element is undesirably increased in order to accommodate the contemplated sealing mechanism. For mass production techniques, the pressure transducer itself should be without additional lateral extensions thereof to accommodate a sealing ring. This is especially true for the silicon and glass anodically-bonded pressure transducers discussed above.

As noted above, some of the prior sensor assemblies do not provide sufficient isolation of the electrical output connections of the transducer with respect to the sensed ambient atmosphere pressure. When the ambient atmosphere/fluid being sensed is corrosive, this can be extremely detrimental to the reliability of the pressure sensor assembly. Some pressure sensor assemblies, such as that shown in U.S. Pat. No. 4,178,921 to Simonelic et al., contemplate providing an ambient atmosphere sealing ring directly on the perimeter of the sensing diaphragm. This apparently would prevent the sensed atmosphere/fluid from contacting the transducer output connections. However, this structure also undesirably increases the size of the pressure transducer element and may compromise the electrical characteristics of the pressure transducer since the sealing ring may dampen the movement of the diaphragm in response to sensed pressure.

Therefore, prior sensor pressure assemblies have either not provided sufficient protection for the electrical output connections of the pressure transducer or they have undesirably increased the size of the pressure transducer element itself in order to accomplish the sealing which may be required when the pressure transducer is mounted in a housing.

SUMMARY OF THE INVENTION

An object of the present invention is to provide an improved sensor assembly which overcomes the above-mentioned deficiencies of prior assemblies.

In one embodiment of the present invention an improved pressure sensor assembly is provided. The pressure sensor assembly comprises: a base having top and bottom external surfaces each having central and surrounding peripheral portions; a diaphragm with a peripheral portion thereof hermetically bonded to said base top surface peripheral portion and forming a reference pressure cavity between said diaphragm and said base top surface; said base and diaphragm together comprising a pressure transducer having electrical characteristics which vary in response to sensed pressure altering the position of said diaphragm with respect to said base; and electrical output connections for said transducer including at least conductive portions embedded in and passing through said base from said central portion of said base top surface and emerging on said central portion of said base bottom surface; the improvement comprising: a carrier plate having a top surface to which said transducer is mounted and having holes therein for passage of effective extensions of said electrical output connections; housing means for providing mechanical protection for pressure sensor assembly components while providing substantial access to said diaphragm by ambient atmosphere/fluid external to said housing means by way of an opening in said housing means; first inner seal means for bonding at least the peripheral portions of said base bottom surface to said carrier plate to effectively seal said central area of said base bottom surface, from which said electrical output connections emerge, and said holes from ambient atmosphere/fluid surrounding said diaphragm; and second outer seal means positioned between said carrier top surface and said housing means and positioned about said opening in said housing means such that said housing means, said first and second seal means and said carrier plate form an effective seal against ambient atmosphere/fluid surrounding and external to said diaphragm.

The pressure sensor assembly of the present invention, as stated above, preferably comprises a silicon diaphragm anodically bonded to a glass substrate in which either metallized vias or solid feedthrough pin connections (wires) are provided between a central portion of the glass base top surface and a central portion of the glass base bottom surface. The anodic bonding insures that the silicon diaphragm and glass base are hermetically sealed and protects against the ambient atmosphere with respect to any portions of the electrical output connections that are present at the base top surface. Preferably, the carrier plate comprises a ceramic plate substrate wherein a glass sealing material, previously subjected to heat, is utilized as the first inner seal means to bond the glass base of the transducer to the ceramic plate while effectively sealing the central area of the glass base and the carrier plate holes so as to protect the electrical output connections and their effective extensions. The electrical output connections and their extensions preferably comprise wire leads that extend through the holes in the ceramic carrier plate.

Preferably, the first inner seal means comprises multiple layers of glass with temperture coefficients of expansion selected to provide a graded variation between the temperature coefficients of expansion of the glass base and the ceramic carrier plate. Also, preferably the second outer seal means comprises an annular sealing ring that is mounted between a top surface of the ceramic carrier plate to which the pressure transducer is mounted and walls of the housing means. The combination of the glass sealing layers, the outer sealing ring, the ceramic carrier plate and the walls of the housing means provide a protective seal against ambient atmosphere surrounding and external to the pressure transducer diaphragm and housing. Preferably, the housing walls, together with the ceramic carrier plate and sealing ring, effectively form an internal cavity within which additional transducer assembly components are positioned and are connected to the pressure transducer via the wire leads which comprise the effective extensions of the transducer electrical output connections.

By utilizing the above-noted construction, the pressure transducer element comprising the silicon diaphragm and glass substrate base can be readily mass manufactured, and there is no need to provide any lateral extension of either the diaphragm or the glass base. In addition, the electrical output connections of the transducer element itself are effectively sealed against corrosive attack from the ambient atmosphere/fluid whose pressure is sensed by the pressure transducer diaphragm. While the sensor assembly construction for the present invention is advantageous for pressure transducers, it may also be used with other types of transducers where it is desired to protect the electrical output connections. Thus, for example, chemical conductivity transducers could utilize the sensor assembly of the present invention.

BRIEF DESCRIPTION OF THE DRAWING

For a more complete understanding of the present invention, reference should be made to the drawings in which.

DESCRIPTION OF THE PREFERRED EMBODIMENTS OF THE INVENTION

Figure 1:
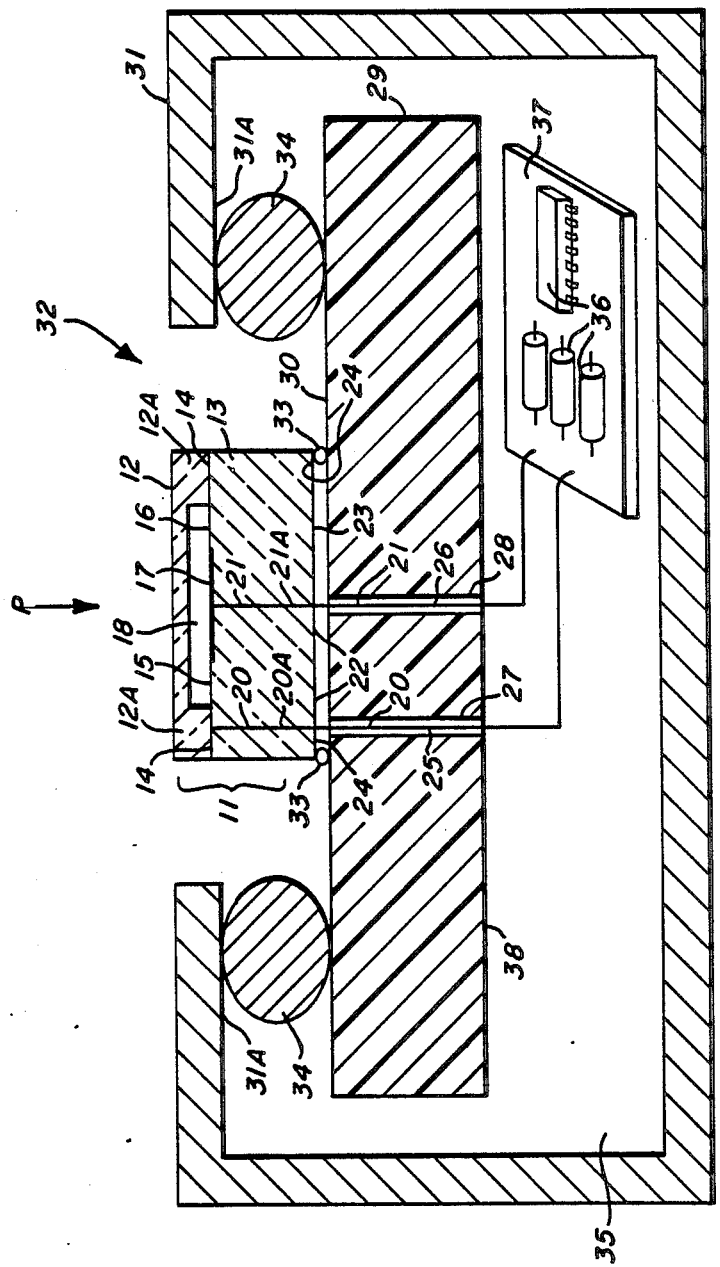
FIG. 1 comprises a combination cross-section and perspective schematic diagram that illustrates pertinent structural features of the pressure sensor assembly of the present invention.

Referring to the drawings, a pressure sensor assembly 10 is illustrated which includes a pressure sensing transducer 11 comprising a diaphragm 12 bonded to a base 13. It should be noted that the term "pressure transducer" is utilized herein to refer to the pressure sensing element itself rather than the various additional electrical components which may be externally connected to the sensing element to arrive at a desired final output signal. The combination of all components connected to the transducer, as well as a housing for the transducer and these components, is generally referred to herein as the pressure sensor assembly.

Preferably, the diaphragm 12 comprises a silicon diaphragm having a peripheral portion 12A which is anodically bonded to a peripheral portion 14 of a top surface 15 of the base 13. The peripheral portion 14 surrounds a central portion 16 of the base top surface 15. The base 13 is sometimes referred to as a glass substrate base and preferably has a glass composition.

A metallization layer or embedded electrode 17 is provided on the base top surface central portion 16, and this metallization layer and the silicon diaphragm 12 act together as a variable capacitor with the amount of capacitance being determined in accordance with the displacement of the diaphragm 12 in response to external ambient atmosphere and/or fluid pressure designated as P in FIG. 1. Preferably, the bonding of the diaphragm 12 to the base 13 occurs by a known anodic bonding process which forms a hermetic seal between the peripheral portions 12A of the diaphragm and the peripheral portions 14 of the base top surface 15. This essentially forms a reference pressure cavity 18 between the diaphragm and the base top surface wherein pressure is measured as the difference between the external ambient atmosphere/fluid pressure P and the pressure maintained in the reference cavity 18. In response to variations of the sensed pressure P, the displacement of the diaphragm 12 will be altered so as to change the capacitance formed between the diaphragm 12 and the metallization 17 and thereby provide an electrical characteristic which varies in response to sensed pressure.

In order to measure the changes in capacitance of the transducer 11, electrical output connections 20 and 21 are provided. The output connections 20 and 21 include at least conductive portions 20A and 21A, respectively, that are embedded in and pass through the base 13 and extend from at least the central portion 16 of the base top surface 15 and emerge on a central portion 22 of a bottom surface 23 of the base 13. The base bottom surface central portion 22 is surrounded by a base bottom surface peripheral portion 24. As noted above, the anodic bonding of the diaphragm 12 to the base 13 provides a hermetic seal between the diaphragm peripheral portions 12A and the base top surface peripheral portion 14 so as to effectively seal the reference pressure cavity 18 against the influences of the ambient atmosphere/fluid pressure P. In addition, this configuration protects the interface of the electrical output connections 20 and 21 which are present on the base top surface 15.

It should be noted that while the present invention is illustrated in the Figures as comprising a silicon capacitive pressure transducer which is anodically bonded between its sensing diaphragm and its substrate base, which is preferably glass, other types of pressure transducers can also be utilized. One such other type of transducer comprises a piezoresistive transducer (PRT) in which deflection of a pressure sensing diaphragm causes a resistive change due to stresses set up in the diaphragm. In addition, materials other than silicon and glass may be utilized, and bonding techniques other than anodic bonding may also be utilized.

Preferably, the electrical output connections 20 and 21 comprise embedded solid feedthrough wires which pass through the base 13 and have integral effective extensions thereof, comprising extensions 25 and 26 illustrated in the Figures, which pass through associated respective holes 27 and 28 in a ceramic carrier plate 29. The holes 27 and 28 have inlet openings, which receive the extensions 25 and 26, positioned adjacent the base bottom surface central portion 22. While preferably the embedded conductive portions 20A and 21A are integral with the wire extensions 25 and 26, respectively, in some situations metallized vias might be utilized for the embedded conductive portions 20A and 21A wherein the wire extensions 25 and 26 still will comprise effective extensions of the metallized vias.

The transducer 11 is mounted to a top surface 30 of the carrier plate 29 which preferably comprises a relatively high temperature ceramic such as aluminum oxide (alumina-Al$_2$O$_3$). A metallic housing 31 is provided for mechanically protecting components of the sensor assembly while still providing substantial access to the diaphragm 12 by the pressure P to be sensed. This is accomplished by virtue of an opening 32 in the housing 31. A hermetic first inner seal 33, shown in FIG. 1 in the form of an annular ring, bonds the peripheral portions 24 of the base bottom surface 23 to the top surface 30 of the ceramic carrier plate 29. This first inner seal 33 effectively seals the central area 22 of the base bottom surface 23, from which the electrical output connections 20 and 21 emerge, and the holes 27 and 28 from the ambient atmosphere/fluid pressure P surrounding the diaphragm 12. Preferably, this inner seal 33, shown in FIGS. 1 and 2, comprises at least two thermally-matched glass sealing layers 33A and 33B which are screen-printed onto the carrier 29. The transducer 11 is then placed on the inner seal 33 and this structure is then heated to a relatively high temperature (400 degrees C.) such that the glass layers at least partially melt to provide the hermetic first inner seal 33. The seal 33 prevents the ambient atmosphere/fluid comprising the sensing pressure P from being in contact with the extensions 25 and 26 of the electrical output connections 20 and 21. Preferably, the seal 33 comprises an inert nonmetallic material.

Figure 2:
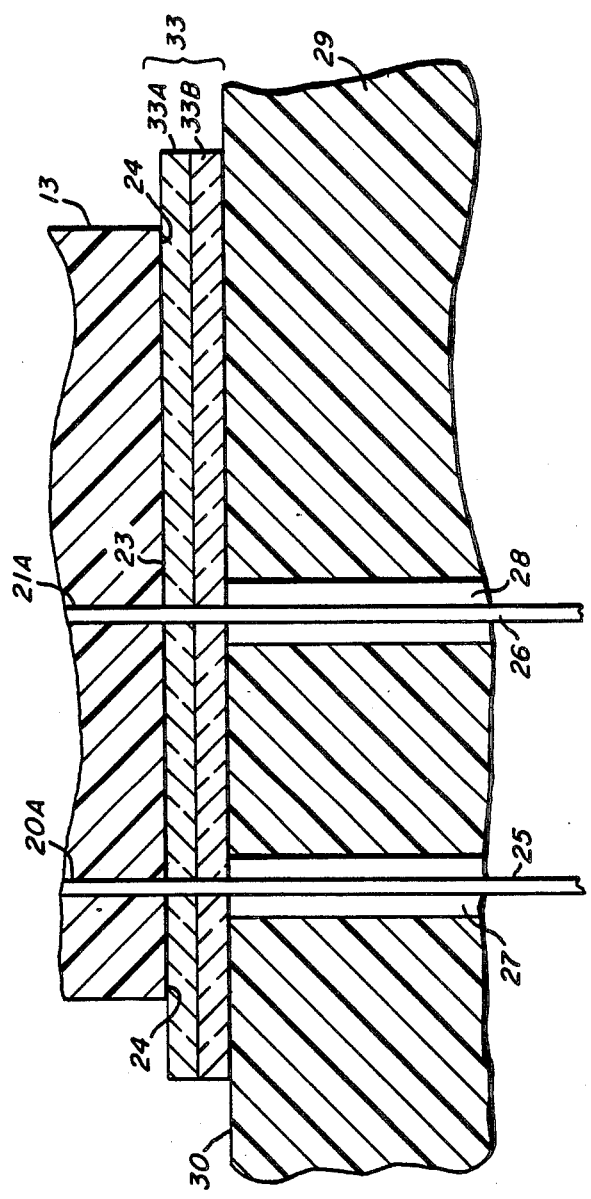
FIG. 2 is an enlarged view of a portion of FIG. 1 illustrating a preferred variation of the present invention.

Referring to FIG. 2, a preferred variation of the first inner seal 33 is shown in which the layers 33A and 33B are explicitly shown. In FIG. 1, the separate layers 33A and 33B were not shown due to the smaller scale of FIG. 1 with respect to FIG. 2. In FIG. 2, at least the glass layer 33A extends at least over substantially all of the base bottom surface 23 so that the portions of the electrical output extensions 25 and 26 between the base and carrier plate 29 are hermetically sealed against the pressure P. The layer 33A is positioned between the base bottom surface 23 and the layer 33B, and layer 33B is positioned between layer 33A and the carrier plate top surface 30. Preferably, the layers 33A and 33B have different temperature coefficients of expansion with the temperature coefficient of expansion of layer 33A being between but more closely matching the temperature coefficient of expansion of the base 13 than the temperature coefficient of expansion of the carrier plate 29. The temperature coefficient of expansion of the layer 33B is also between the temperature coefficients of expansion of the base and carrier plate, but more closely matches the coefficient of the carrier plate than that of the base.

It should be noted that preferably the glass seal 33 is screen-printed and comprises at least two or more layers, each layer comprising an effective different glass frit having a different temperature coefficient of expansion. However, the seal 33 may also comprise a multilayer glass preform. Also, in some instances a single glass layer may be sufficient. In addition, either the annular configuration in FIG. 1, the configuration in FIG. 2, or other suitable configurations may be used for the seal 33. It should also be noted that during the heating of the glass seal 33, the individual layers 33A and 33B may blend somewhat to produce a graded variation in the temperature coefficient of expansion.

A second outer seal comprising an annular sealing ring 34, made of rubber or crushable copper, is positioned between the carrier top surface 30 and walls 31A of the housing 31. The ring 34 is positioned about the opening 32 such that the housing 31, the first seal 33, the second seal 34 and the carrier plate 29 form an effective seal against ambient atmosphere/fluid surrounding and external to the transducer diaphragm 12 wherein this atmosphere/fluid corresponds to the atmosphere/fluid of the sensing pressure P. Preferably, the seals 33 and 34, the carrier 29 and housing 31 form an internal cavity 35 that is sealed with respect to external ambient pressure P. Inside the cavity 35 additional components 36 of the pressure sensor assembly 10 are positioned and are electrically connected to the pressure transducer 11 via the extensions 25 and 26 which are part of the electrical output connections 20 and 21. The components 36 are mounted on a metallized ceramic circuit board 37 that may be mounted to a bottom surface 38 of the carrier plate 29. To minimize the lead length between the components 36 and the output lead extensions 25 and 26, holes may be provided in the circuit board 37 through which the extensions (wires) 25 and 26 pass.

It is understood that some sort of support mechanism may be provided so as to bias the carrier plate 29 toward the walls 31A of the housing 31 and thereby compress the rubber sealing ring 34 to insure the proper sealing of the internal cavity 35 with respect to the ambient external pressure P. This biasing structure is understood and is not illustrated in the Figures. In addition, it is understood that the sensed ambient external pressure P which surrounds the housing 31 can be either a gaseous atmosphere or a liquid, and the pressure sensor assembly of the present invention can be utilized in either case to provide effective sealing of the conductive metal electrical output connections 20 and 21 from this external ambient atmosphere/fluid which may be corrosive with respect to the electrical output connections. It should be noted that if the external atmosphere is not particularly corrosive, and if extreme pressures are not subjected to the diaphragm 12, then possibly the glass seal 33 can be replaced by other materials. However, for maximum ruggedness of the assembly, as well as insuring its operation in corrosive atmospheres, the seal 33 should be glass having a composite temperature coefficient of expansion selected to be substantially between the temperature coefficient of expansion of the ceramic carrier plate 29 and the glass substrate base 13. This insures proper operation of the sensor assembly over a wide temperature range.

By virtue of the specific structural configuration discussed above, it can be seen how the present pressure sensor assembly allows the use of a minimum size pressure transducer 11 while insuring that the electrical output connections to the pressure transducer are protected against the ambient atmosphere/fluid whose pressure is being sensed. This is accomplished without any undesirable lateral extension of either the pressure transducer diaphragm 12 or the base 13, and without providing any sealing means on the diaphragm which may undesirably dampen diaphragm movement. While the sensor assembly construction for the present invention is advantageous for pressure transducers, it may also be used with other types of transducers where it is desired to protect the electrical output connections. Thus, for example, chemical conductivity transducers could utilize the sensor assembly of the present invention. While specific embodiments of the present invention have been shown and described, further modifications and improvements will occur to those skilled in the art. All such modifications which retain the basic underlying principles disclosed and claimed herein are within the scope of this invention.

I claim:

1. A pressure sensor assembly comprising:
   a base having top and bottom external surfaces each having central and surrounding peripheral portions;
   a diaphragm with a peripheral portion thereof hermetically bonded to said base top surface peripheral portion and forming a reference pressure cavity between said diaphragm and said base top surface;
   said base and diaphragm together comprising a pressure transducer having electrical characteristics which vary in response to sensed pressure altering the position of said diaphragm with respect to said base; and
   electrical output connections for said transducer including at least conductive portions embedded in and passing through said base from said central portion of said base top surface and emerging on said central portion of said base bottom surface;
   the improvement comprising:
   a carrier plate having a top surface to which said transducer is mounted and having holes therein for passage of effective extensions of said electrical output connections;
   housing means for providing mechanical protection for pressure sensor assembly components while providing substantial access to said diaphragm by ambient atmosphere/fluid external to said housing means by way of an opening in said housing means;
   first inner seal means for bonding at least the peripheral portions of said base bottom surface to said carrier plate to effectively seal said central area of said base bottom surface, from which said electrical output connections emerge, and said holes from ambient atmosphere/fluid surrounding said diaphragm; and
   second outer seal means positioned between said carrier top surface and said housing means and positioned about said opening in said housing means such that said housing means, said first and second seal means and said carrier form an effective seal against ambient atmosphere/fluid surrounding and external to said diaphragm.

2. A pressure sensor assembly according to claim 1 wherein said first inner seal means comprises an inert nonmetallic material.

3. A pressure sensor assembly according to claim 2 wherein said inert nonmetallic material comprises a glass composition which has been heated so as to bond said base to said carrier plate.

4. A pressure sensor assembly according to claim 3 wherein said first inner seal means comprises, at least prior to said heating, first and second layers of glass material, said first layer positioned between said base bottom surface and said second layer and said second layer positioned between said first layer and said carrier top surface.

5. A pressure sensor assembly according to claim 4 wherein said first and second layers have different temperature coefficients of expansion, the temperature coefficient of expansion of said first layer being between but more closely matching the temperature coefficient of expansion of said base than said carrier plate while the temperature coefficient of said second layer being between but more closely matching the temperature coefficient of expansion of said carrier plate than said base.

6. A pressure sensor assembly according to claim 5 wherein said first inner seal means comprises screen printed layers of effectively different glass frits.

7. A pressure sensor assembly according to claim 5 wherein said first inner seal means comprises at least one glass preform positioned between said base and said carrier plate.

8. A pressure sensor assembly according to claim 3 wherein said first inner seal means comprises at least one layer of glass material which extends at least over substantially all of said base bottom surface.

9. A pressure sensor assembly according to claim 3 wherein said first inner seal means comprises an annular ring of glass material.

10. A pressure sensor assembly according to claim 3 wherein said embedded portions and effective extensions of said electrical output connections comprise wire with portions embedded in the base and integral extensions of said wires comprising said effective extensions.

11. A pressure sensor assembly according to claim 10 wherein said carrier plate comprises a ceramic plate.

12. A pressure sensor assembly according to claim 11 wherein said ceramic carrier plate is manufactured from aluminum oxide material.

13. A pressure sensor assembly according to claim 1 wherein said diaphragm is constructed from silicon material.

14. A pressure sensor assembly according to claim 13 wherein said base has a glass composition.

15. A pressure sensor assembly according to claim 14 wherein said silicon diaphragm and glass base are anodically bonded together.

16. A pressure sensor assembly according to claim 15 wherein said transducer comprises a capacitive pressure transducer and wherein said silicon diaphragm comprises one electrode of a pressure sensing capacitor and wherein a metal component/metallization is positioned on said base top surface as another electrode of said pressure sensing capacitor.

17. A pressure sensor assembly according to claim 16 wherein said first inner seal means comprises an inert nonmetallic material and wherein said inert nonmetallic material comprises a glass composition which has been heated so as to bond said base to said carrier plate.

18. A pressure sensor assembly according to claim 17 wherein said carrier plate comprises a ceramic plate.

19. A pressure sensor assembly according to claim 18 wherein said first inner seal means comprises, at least prior to said heating, first and second layers of glass material, said first layer positioned between said base bottom surface and said second layer and said second layer positioned between said first layer and said carrier top surface, and wherein said first and second layers have different temperature coefficients of expansion, the temperature coefficient of expansion of said first layer being between but more closely matching the temperature coefficient of expansion of said base than said carrier plate while the temperature coefficient of said second layer being between but more closely matching the temperature coefficient of expansion of said carrier plate than said base.

20. A pressure sensor assembly according to claim 1 wherein said housing means, said first and second seal means and said carrier plate effectively form an internal cavity isolated from the sensed ambient atmosphere/fluid, and wherein electrical components, electrically connected to said pressure transducer via said effective extensions of said electrical output connections, are positioned within said internal cavity.

21. A sensor assembly comprising:
a base having top and bottom external surfaces each having central and surrounding peripheral portions;
said base comprising at least part of a transducer having electrical characteristics which vary in response to a sensed parameter of an ambient atmosphere/fluid; and
electrical output connections for said transducer including at least conductive portions embedded in and passing through said base from said central portion of said base top surface and emerging on said central portion of said base bottom surface;
the improvement comprising:
a carrier plate having a top surface to which said transducer is mounted and having holes therein for passage of effective extensions of said electrical output connections;
housing means for providing mechanical protection for pressure sensor assembly components while providing substantial access to said transducer by ambient atmosphere/fluid external to said housing means by way of an opening in said housing means;
first inner seal means for bonding at least the peripheral portions of said base bottom surface to said carrier plate to effectively seal said central area of said base bottom surface, from which said electrical output connections emerge, and said holes from ambient atmosphere/fluid surrounding said transducer; and
second outer seal means positioned between said carrier top surface and said housing means and positioned about said opening in said housing means such that said housing means, said first and second seal means and said carrier form an effective seal against ambient atmosphere/fluid surrounding and external to said transducer.

22. A pressure sensor assembly according to claim 21 wherein said first inner seal means comprises an inert nonmetallic material.

23. A pressure sensor assembly according to claim 22 wherein said inert nonmetallic material comprises a glass composition which has been heated so as to bond said base to said carrier plate.

24. A pressure sensor assembly according to claim 23 wherein said first inner seal means comprises, at least prior to said heating, first and second layers of glass material, said first layer positioned between said base bottom surface and said second layer and said second layer positioned between said first layer and said carrier top surface.

25. A pressure sensor assembly according to claim 24 wherein said first and second layers have different temperature coefficients of expansion, the temperature coefficient of expansion of said first layer being between but more closely matching the temperature coefficient of expansion of said base than said carrier plate while the temperature coefficient of said second layer being between but more closely matching the temperature coefficient of expansion of said carrier plate than said base.

26. A pressure sensor assembly according to claim 25 wherein said first inner seal means comprises screen printed layers of effectively different glass frits.

27. A pressure sensor assembly according to claim 25 wherein said first inner seal means comprises at least one glass preform positioned between said base and said carrier plate.

28. A pressure sensor assembly according to claim 23 wherein said first inner seal means comprises at least one layer of glass material which extends at least over substantially all of said base bottom surface.

29. A pressure sensor assembly according to claim 23 wherein said first inner seal means comprises an annular ring of glass material 30. A pressure sensor assembly according to claim 23 wherein said embedded portions and effective extensions of said electrical output connections comprise wire with portions embedded in the base and integral extensions of said wires comprising said effective extensions.

* * * * *